United States Patent
Simon

(10) Patent No.: US 11,112,084 B1
(45) Date of Patent: Sep. 7, 2021

(54) REFRACTING ELEMENTS, INCLUDING BALL LENSES THAT CONCENTRATE AND PROVIDE UNOBSTRUCTED OPTICAL PATHWAYS FROM MULTIPLE LIGHT SOURCES

(71) Applicant: Jerome H. Simon, Watertown, MA (US)

(72) Inventor: Jerome H. Simon, Watertown, MA (US)

( * ) Notice: Subject to any disclaimer, the term of this patent is extended or adjusted under 35 U.S.C. 154(b) by 0 days.

(21) Appl. No.: 15/045,031

(22) Filed: Feb. 16, 2016

Related U.S. Application Data

(60) Provisional application No. 62/176,370, filed on Feb. 13, 2015.

(51) Int. Cl.
| | |
|---|---|
| F21V 5/04 | (2006.01) |
| F21V 7/00 | (2006.01) |
| F21V 14/04 | (2006.01) |
| F21V 14/02 | (2006.01) |
| F21V 5/02 | (2006.01) |
| F21V 29/70 | (2015.01) |
| F21Y 115/10 | (2016.01) |

(52) U.S. Cl.
CPC ............... *F21V 5/041* (2013.01); *F21V 5/02* (2013.01); *F21V 7/00* (2013.01); *F21V 14/02* (2013.01); *F21V 14/04* (2013.01); *F21V 29/70* (2015.01); *F21Y 2115/10* (2016.08)

(58) Field of Classification Search
CPC . F21V 5/04; F21V 5/048; F21V 5/041; F21V 7/00; F21V 7/0066; F21V 7/048; F21V 13/04; F21V 5/043; F21V 5/08; F21V 7/0083; F21V 7/09; F21V 7/0025; F21V 14/04; F21V 14/06; F21V 15/01; F21V 17/02; F21V 21/14; F21V 5/007; F21V 31/007; F21V 14/02; G02B 6/4204; G02B 6/4214; G02B 27/0955; G02B 27/0977; G02B 2003/0093; F21K 9/65; F21K 9/68; F21K 9/69; F21Y 2115/10; F21Y 2101/00; F21Y 2103/10
See application file for complete search history.

(56) References Cited

U.S. PATENT DOCUMENTS

| | | | | |
|---|---|---|---|---|
| 3,596,136 | A * | 7/1971 | Fischer | C03C 3/321 250/552 |
| 4,156,206 | A * | 5/1979 | Comerford | H01S 5/02 372/101 |
| 4,727,457 | A * | 2/1988 | Thillays | G02B 6/4204 257/E25.02 |
| 6,218,659 | B1 * | 4/2001 | Bidiville | G06F 3/0312 250/221 |
| 6,781,209 | B1 * | 8/2004 | Althaus | G02B 6/4204 257/100 |

(Continued)

FOREIGN PATENT DOCUMENTS

| | | | | |
|---|---|---|---|---|
| JP | 57212409 | A * | 12/1982 | ........... G02B 6/4206 |
| JP | 2011238577 | A * | 11/2011 | |

*Primary Examiner* — Erin Kryukova

(74) *Attorney, Agent, or Firm* — Burns & Levinson LLP; Jerry Cohen

(57) ABSTRACT

An optical system for architectural lighting products includes an optical chain including an LED light source, a first optic begin a spherical ball lens and a second optic disposed to intercept and modify at least a portion of a beam projected by the ball lens.

2 Claims, 7 Drawing Sheets

(56) References Cited

U.S. PATENT DOCUMENTS

| | | | |
|---|---|---|---|
| 8,168,939 B2* | 5/2012 | Mack | H04B 10/503 |
| | | | 250/225 |
| 8,616,734 B2* | 12/2013 | Olsson | H01L 33/58 |
| | | | 362/311.02 |
| 9,608,731 B2* | 3/2017 | Gudeman | H04B 10/516 |
| 2002/0075452 A1* | 6/2002 | Kessler | G02B 27/225 |
| | | | 353/7 |
| 2004/0218858 A1* | 11/2004 | Guy | F21V 5/04 |
| | | | 385/33 |
| 2005/0025420 A1* | 2/2005 | Farr | G02B 6/4209 |
| | | | 385/33 |
| 2006/0078262 A1* | 4/2006 | Chen | G02B 6/4206 |
| | | | 385/93 |
| 2006/0187653 A1* | 8/2006 | Olsson | H01L 33/58 |
| | | | 362/111 |
| 2007/0019960 A1* | 1/2007 | Kuwata | G02B 6/4206 |
| | | | 398/118 |
| 2007/0064409 A1* | 3/2007 | Hulse | F21V 5/041 |
| | | | 362/84 |
| 2008/0088947 A1* | 4/2008 | Martinez | G01N 21/031 |
| | | | 359/710 |
| 2008/0123351 A1* | 5/2008 | Olsson | H01L 33/58 |
| | | | 362/335 |
| 2009/0016678 A1* | 1/2009 | Kawamura | G02B 6/4214 |
| | | | 385/33 |
| 2016/0126696 A1* | 5/2016 | Gudeman | B81C 1/00301 |
| | | | 438/27 |

* cited by examiner

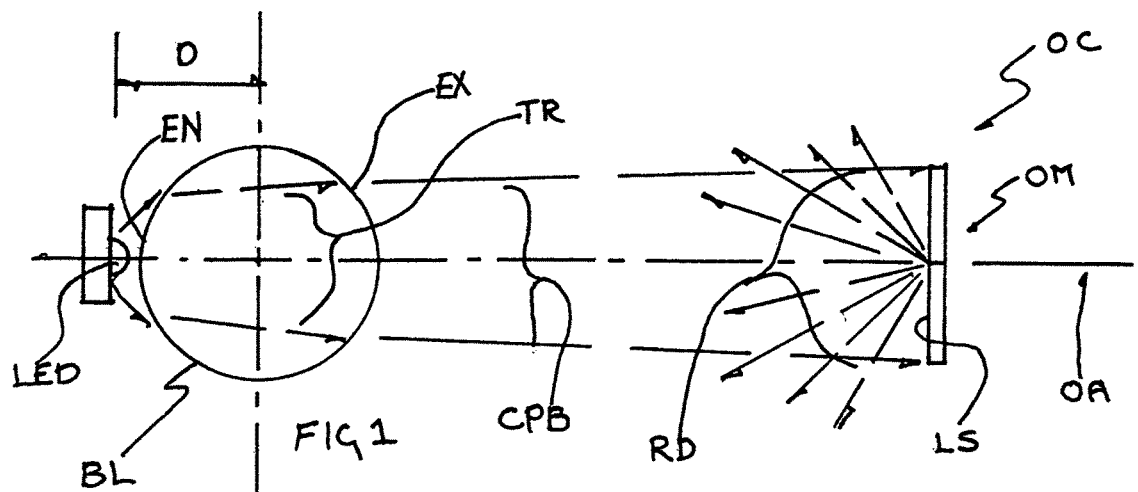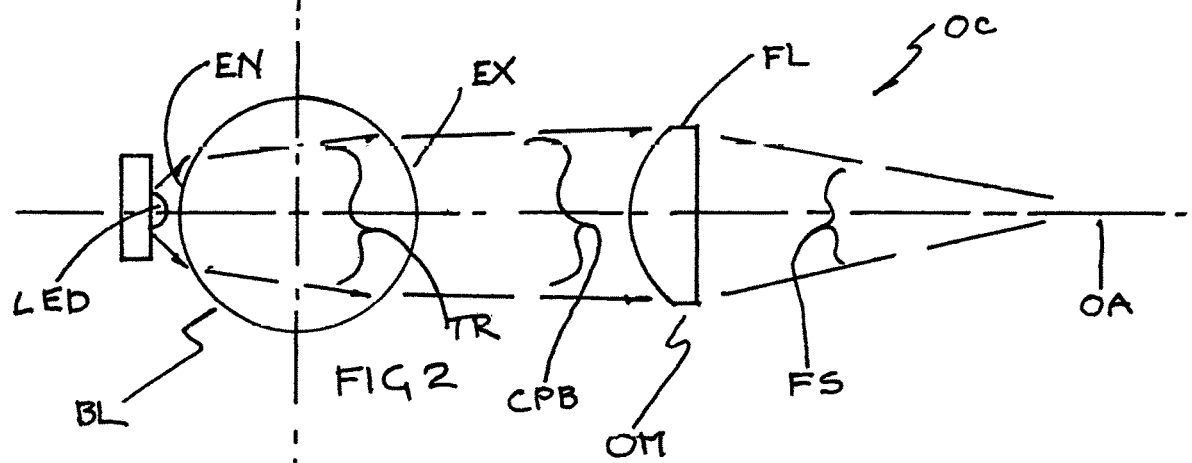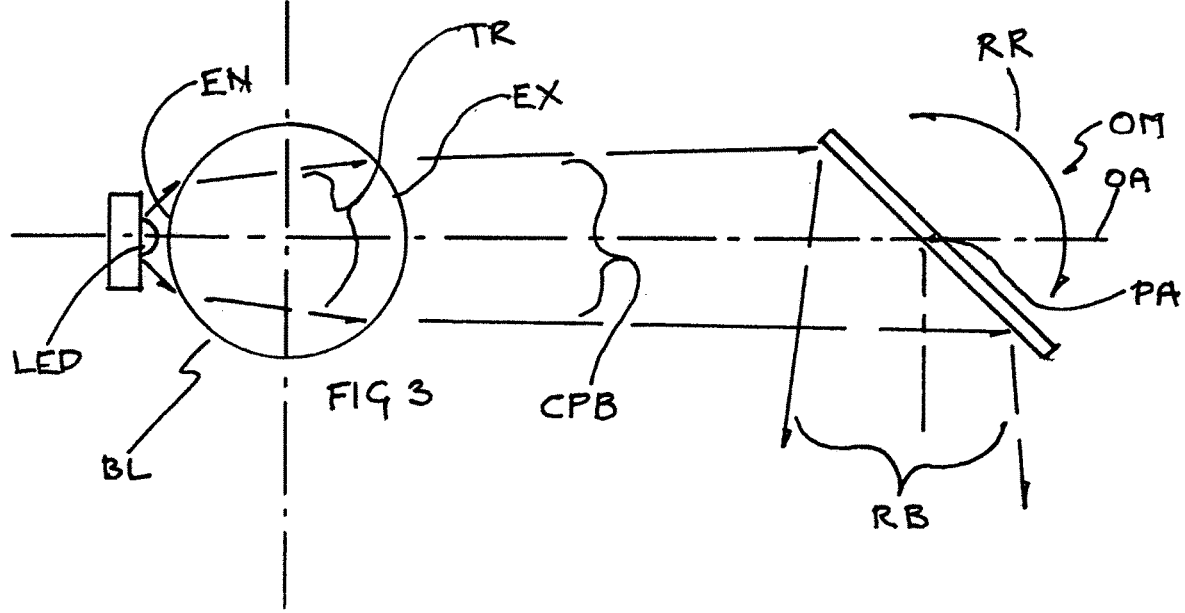

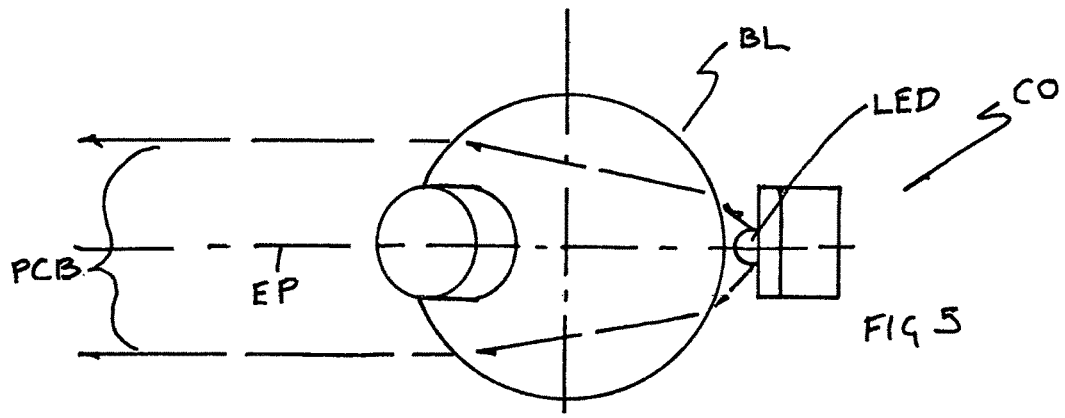
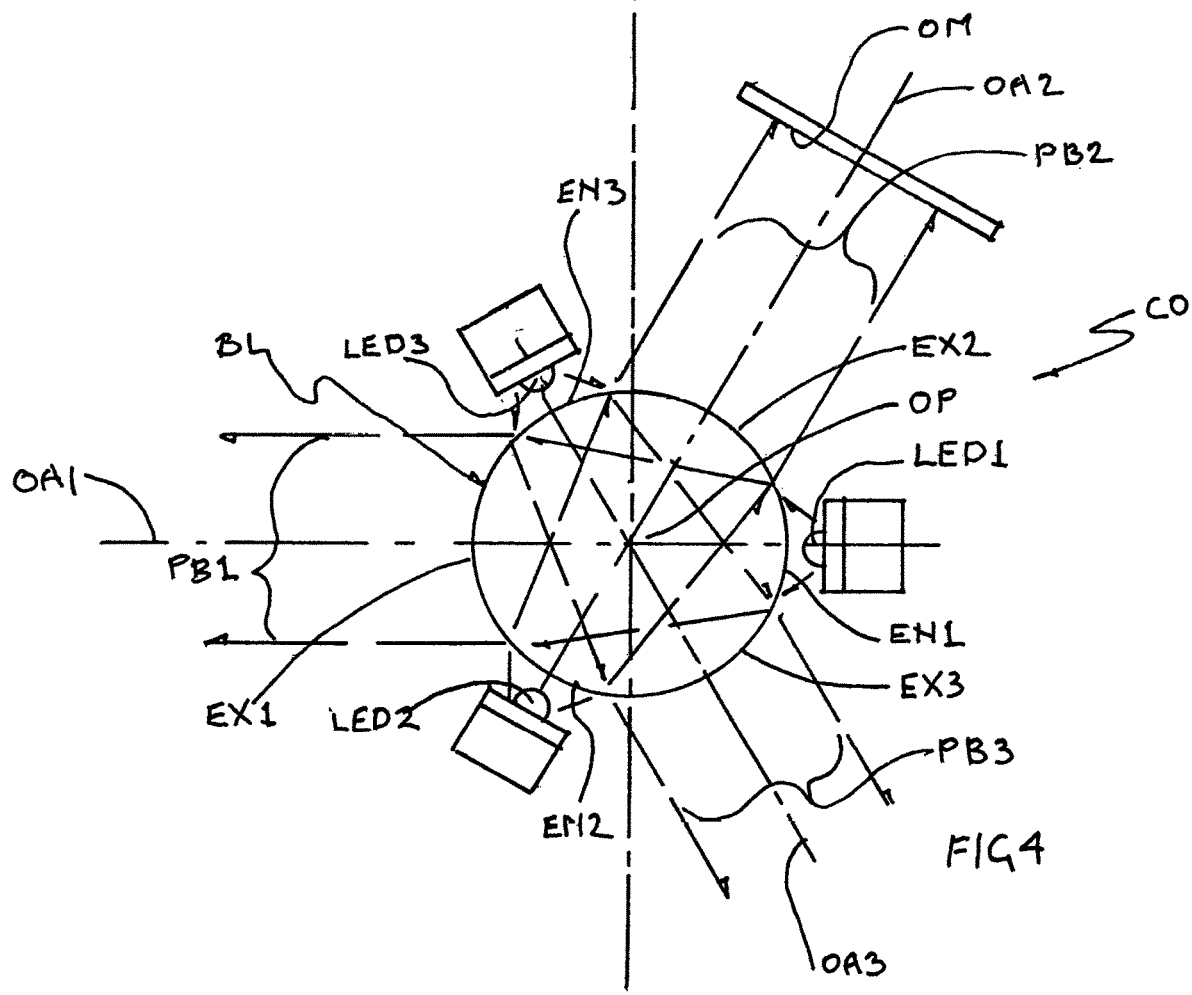

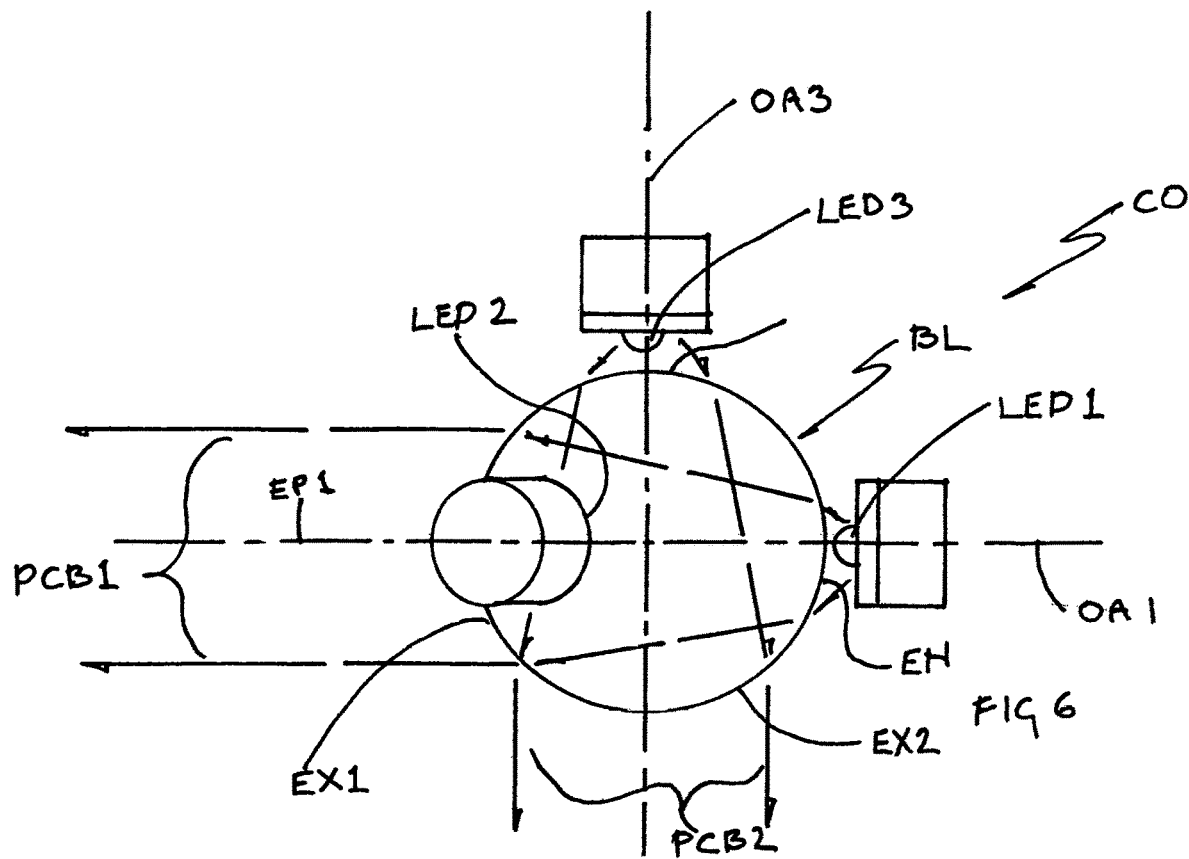
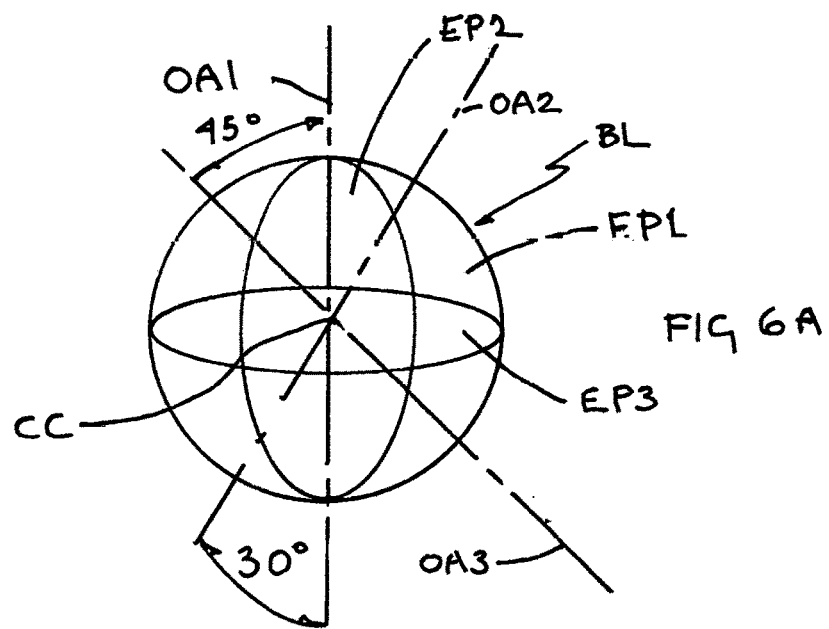

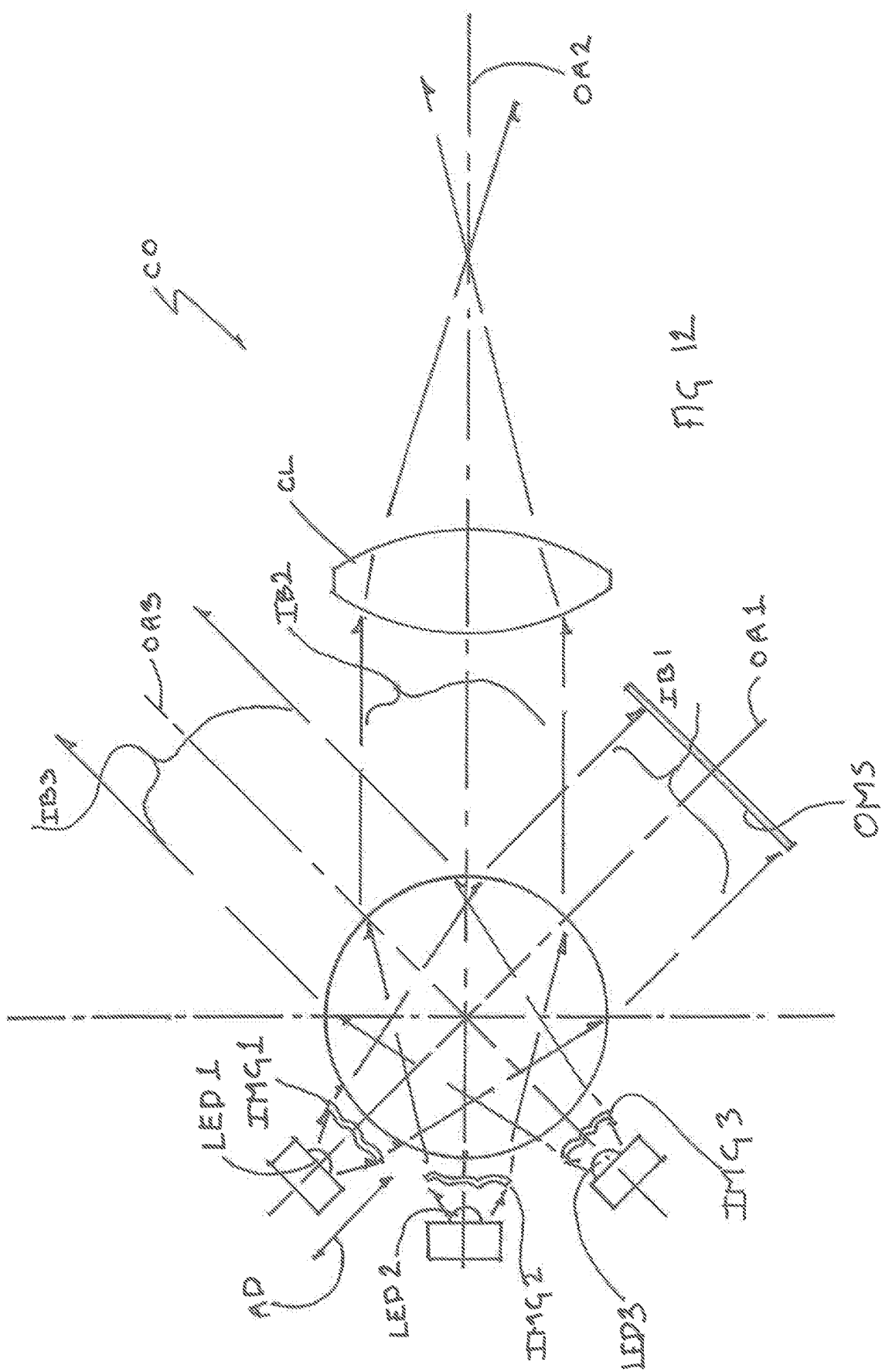

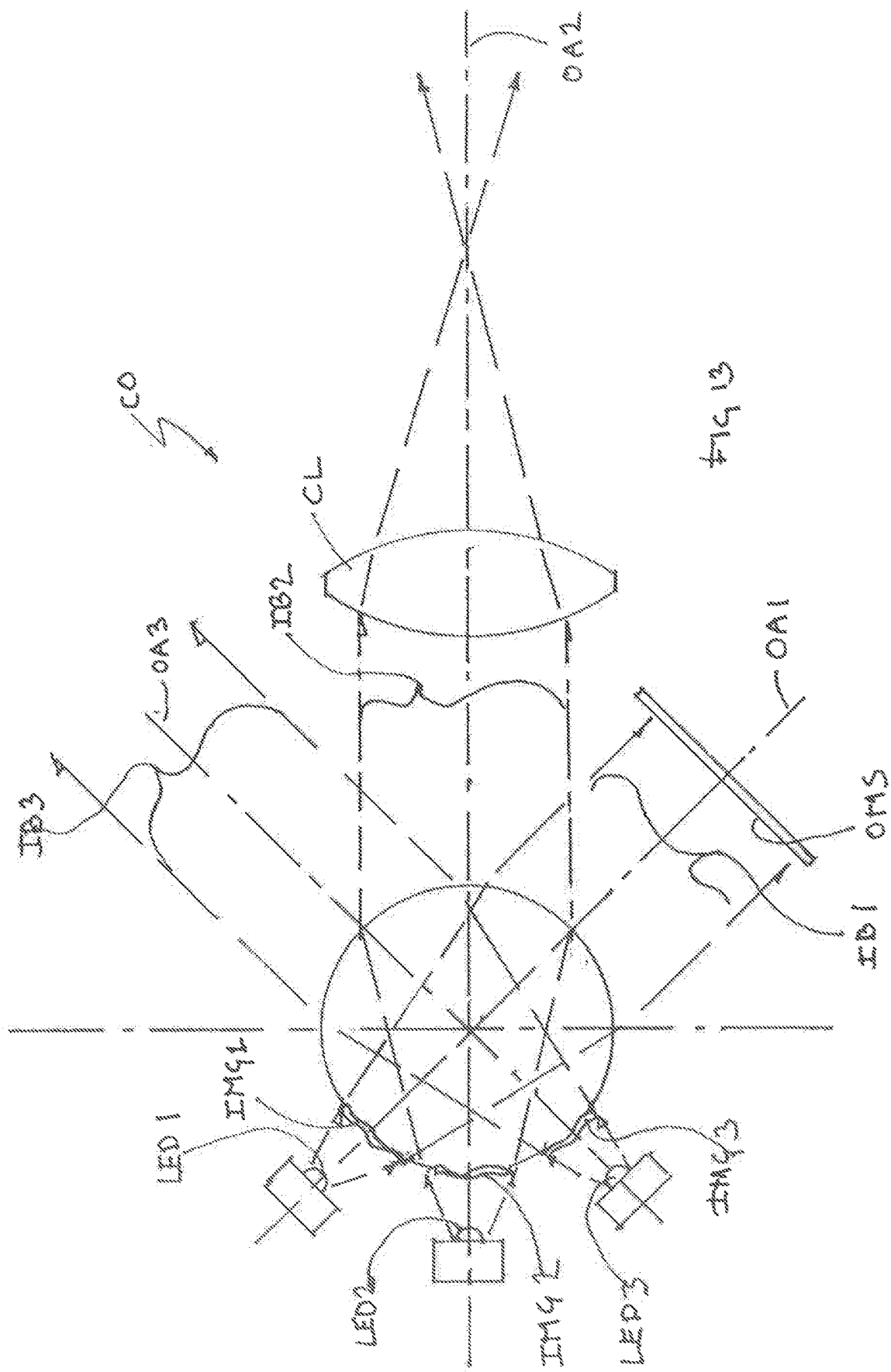

REFRACTING ELEMENTS, INCLUDING BALL LENSES THAT CONCENTRATE AND PROVIDE UNOBSTRUCTED OPTICAL PATHWAYS FROM MULTIPLE LIGHT SOURCES

CROSS REFERENCE TO RELATED APPLICATIONS

This application claims priority from U.S. Provisional Patent Application Ser. No. 62/176,370, filed Feb. 13, 2015 and incorporated herein by reference in its entirety.

FIELD OF THE INVENTION

The present invention generally relates to light fixtures using LED light sources, and in particular to such devices which create multiple projected light beams.

SUMMARY OF THE INVENTION

One embodiment of the present invention provides an optical system for use in various lighting products and applications, comprising: a chain of optical components, each component substantially aligned along a common optical axis the chain including; a first component being an LED; a second component being a first optic being a substantially spherical ball lens that collects, and projects light emanating from the LED, as a concentrated beam; and a third component being a second optic, so disposed as to intercept and modify at least a portion of the beam projected from the ball lens.

The LED may contain an array of dies, the ball lens so disposed in its distance from the LED so as to project an image of the array of dies onto the secondary optic. The second optic may contain a reflective surface and is mounted on a mechanical device so as to be positioned to redirect the concentrated beam projected from the ball optic. The second optic may be a focusing lens, increasing the concentrating power of the ball lens. The second optic may contain a lambertian reflecting surface to spread the concentrated beam projected from the ball lens. The optical system may further comprise a fourth optic at least partially surrounding the LED and positioned so as to intercept and modify light emanating from the LED that is not intercepted by the ball optic. The fourth optic may contain a prismatic portion or a reflective portion. The ball lens may consist of two one-half ball lenses.

Another embodiment of the present invention provides as optical system for use in various lighting products and applications, comprising: at least two separate chains of optical components, each chain containing; a first optic least being an LED; and a second optic being a ball lens, the ball lens being common to each of the separate optical chains; each chain substantially aligned along its own associated optical axis, each optical axis substantially coincident with an equatorial plane and a central axis through the singular common ball lens, the LED of each optical chain so disposed about the ball lens, so that the ball lens collects and projects light emanating from each of LEDs as an individual separate concentrated beam radiating along its associated optical axis outward and away from the ball lens. At least one of the optical chains may contain an optic that is so disposed as to intercept the concentrated beam projected by the ball lens.

Yet another embodiment of the present invention provides an opto-mechanical system for use in various lighting products and applications, comprising; a chain of optical components, each component substantially aligned with a common optical axis; a first component being at least one quasi point source such as an LED; a second component being a first optic which is spherical ball lens that collects, concentrates and projects light emanating from the LED as a concentrated beam; a third component being a second optic so disposed as to intercept and modify the concentrated beam projected by the ball lens; and the ball lens having an axis of rotation substantially perpendicular to the optical axis, around which the common axis and at least one the optical components can rotate, the components of the optical chain mechanically connected so that the second optic remains in position with the common optical axis so as to continue to intercept the concentrated beam projected by the ball lens.

The mechanical connections of the components may be designed so to enable a rotation of the second optic around the axis of rotation of the ball lens. The mechanical connections of the components may be designed to enable the rotation of the LED around the axis of rotation of the ball lens. The mechanical connection to the ball lens may be such as to enable the ball lens to function as a ball bearing. The LED may be mounted to a heat sink, the heat sink being located on one side of the ball lens at one end of the optical chain, the second optic being located substantially on the opposite side of the ball lens at the other end of the optical chain, the heat sink and the second optic being mechanically connected, the heat sink acting to counterbalance weight of the second optic, as both the heat and second optic rotate in unison around the rotational axis. The reflective portion may redirect the light through the ball lens. The rotational position of the ball lens may be fixed so it does not rotate around the rotational axis. The optical system may further comprise a fourth optic, being an imaging surface so disposed between the LED and the ball optic so the imaging surface is projected by the ball optic onto the third optic. The image surface may co-occupy the surface of the ball lens.

BRIEF DESCRIPTION OF THE DRAWINGS

FIG. 1 is a diagram of an optical system that employs an optical chain of optical components including an LED, a ball lens and one type of optical modifier that can be used in a variety of lighting products.

FIG. 2 is a diagram of an optical system similar to that described in FIG. 1, differing in the type of optical modifier employed is a lens.

FIG. 3 is a diagram of an optical system similar to that described in FIG. 1, differing in that the type of optical modifier employed is a pivoting reflector.

FIG. 4 is a first view of an optical system that employs multiple chains of optical components.

FIG. 5 is a second view of an optical system similar to the optical system illustrated in FIG. 4.

FIG. 6 is a diagram of an optical system similar to the optical system of FIG. 4, but having a different geometric positioning between the optical chains.

FIG. 6A is a diagram illustrating an example of the geometric relationship of three optical axes.

FIG. 12 is a diagram of an optical system for projecting multiple images.

DETAILED DESCRIPTION OF THE DRAWINGS

Figure 7:
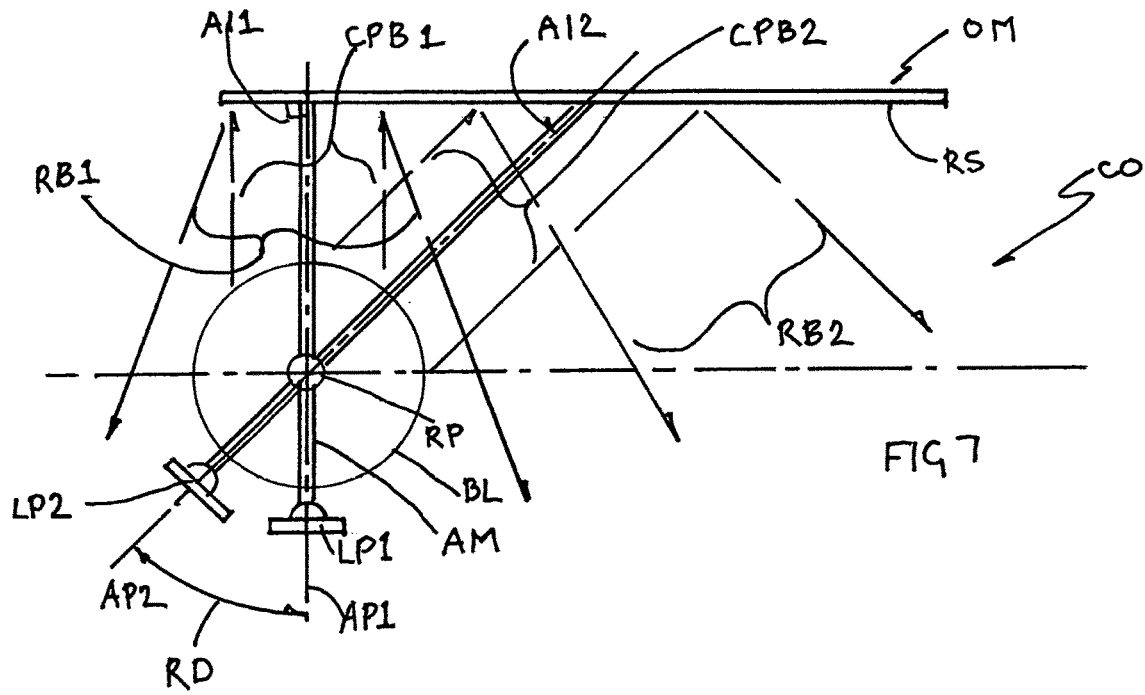
FIG. 7 is a diagram of an optical system similar to that of FIG. 1, with the addition of a mechanical device that provides a degree(s) of freedom for portion of the optical chain to rotate.

FIG. 1 is a diagram of an optical system OC that can be used in a variety of lighting products such as, hard wired, hand held, or cord and plug architectural lighting products as well as products for entertainment, commercial, industrial, medical and scientific applications. The optical system contains a chain of at least three distinct optical components disposed along a common optical axis OA. In some embodiments the optical axis OA may be centrally disposed through all of the optical components, in other embodiments at least one of the optical components may be at least partially offset from the optical axis.

The at least three optical components are as follows: A quasi point light source such as an LED, a substantially spherically shaped ball lens BL, and an optical modifier OM. At least a portion of the light emanating from the LED is collected and concentrated through a convex entry surface, EN of ball lens BL, and is further concentrated as it exits ball lens BL through convex exit surface EX as a concentrated projected beam CPB. The optical modifier OM is disposed at a predetermined distance from ball lens BL so as to intercept and modify concentrated projected beam CPB. In this embodiment the optical modifier has, at least in part, a lambertian surface LS, which reflects at least a portion of intercepted beam CPB as widely distributed light RD.

In some embodiments the LED can contain a single chip, or an array of chips of single or multiple colors. The ball lens BL can be fabricated from a substantially clear material such as acrylic, polycarbonate, urethane and other suitable plastics, or crystal or optical glass. Optical modifiers can contain such materials such as reflective metal, reflective and refractive films, internally reflecting glass and plastics, and reflective paints. Optical modifiers can be of the type and be employed to focus broaden concentrated projected beams.

FIG. 2 is a diagram of an optical system OC similar to the optical system illustrated in FIG. 1 differing in that the optical modifier OM is a focusing lens FL that intercepts and focuses concentrated beam CPB as focused beam FB. In some embodiments focusing lens FL can be a positive Fresnel lens, a single or double convex lens, or a Fresnel type or, single or double cylindrical lens.

FIG. 3 is a diagram of an optical system OC similar to the optical system illustrated in FIG. 2 differing in the optical modifier OM is mounted on a pivot axis PA allowing optical modifier at least one degree of rotational freedom RR, and therefore redirect concentrated projected beam CRB as redirected beam RB to various locations.

FIG. 4 is a plan view diagram of an optical system CO that can be used in architectural lighting products. The optical system integrates three separate chains of optical components in as much as the optical components of each chain utilize a common ball lens BL, and the optical axes, specifically called out as OA1, OA2, and OA3 have a common meeting point OP located substantially at the center of the ball lens. Each optical chain includes an LED, LED1, LED2 and LED3, each disposed at an associated entry surface EN1, EN2 and EN3 of the common ball lens BL. At least a portion of the light emanating from each of the LEDs, LED1, LED2 and LED3 is collected and concentrated by its associated entry surface EN1, EN2 and EN3 respectively, and is further concentrated as it exits ball lens BL through exit surfaces EX1, EX2, and EX3, and are each projected as concentrated beams PB1, PB2, and PB3 respectively. FIG. 4 further illustrates concentrated beam PB2 is being intercepted by optical modifier OM.

FIG. 5 is a 90 degree rotated diagram of the optical system shown in FIG. 4 illustrating that all optical axes substantially lie upon a common equatorial plane through the common ball lens BL.

FIG. 6 is a diagram of an optical system similar to that illustrated in FIGS. 4 and 5, differing in that both optical axes OA1 and OA2 (due to the view of the diagram is not shown) respectively of LED1 and LED2 lie upon a common equatorial plane EP1, while optical axis OA3 of IED3 lies on a different equatorial plane EP2. Although equatorial planes EP1 and EP2 are graphically illustrated to be at substantially 90 degrees to each other, in other embodiments equatorial planes on which optical axes lie can be at any angular position to each other. Also, the number of equatorial planes that are within any common ball lens and the number of optical axes that lie on the equatorial planes is only limited by the function and requirements of the optical system.

FIG. 6A is a diagram, using the picture plane as a constant, illustrating an example of the geometric relationship of three optical axes OA1, OA2 and OA3 to three corresponding equatorial planes EP1, EP2 and EP3, and to a ball lens BL common to the optical axes and their corresponding equatorial axes. Equatorial plane EP1 is parallel to picture plane of the diagram, equatorial plane EP2 is rotated at 60 degrees to the picture plane, and equatorial plane EP2 is rotated at 75 degrees to the picture plane. Optical axis OA lies within equatorial plane EP1 and is at 0 degrees to the picture plane, optical axis OP2 lies within the equatorial plane EP2 and is at 30 degrees rotationally off set to the picture plane, and optical axis OA3 is 45 degrees rotationally offset to the picture plane. Optical Axis's OP1, OP2 and OP3 pass through center point CC of Ball Lens B.

FIG. 7 is a diagram of an optical system CO similar to that illustrated in FIG. 1, with an additional specification being that the LED(s) (shown in two positions LP1 and LP2) has a degree(s) of freedom to rotate (arrow RD) around the center point RP of ball lens BL. Mechanical assembly AM maintains a constant distance between the LED(s) and the ball lens center RP, as well as a constant distance between the ball lens center RP from the surface of optical modifier OM, while the LED(s) rotate around the ball Lens center point RP. As the LED(s) and its associated optical axis rotates around ball lens center RP, it's associated concentrated projected beam LP1 and LP2 is intercepted by optical modifier OM at different and changing angle of incidence, shown as angle of incidence AI1 and angle of incidence AI2 respectively. Depending on the mechanical functions designed into the mechanical assembly AM, in one embodiment, the ball lens BL rotates along with the rotation of the LED(s), in another embodiment ball lens BL is rotationally fixed while the LED(s) rotate about the ball lens center RF. In still another embodiment the ball lens BL could be mounted in a mechanical assembly such as a rotational cup or gimbal mount providing for a spherical degree of motion of the ball lens.

Figure 8:
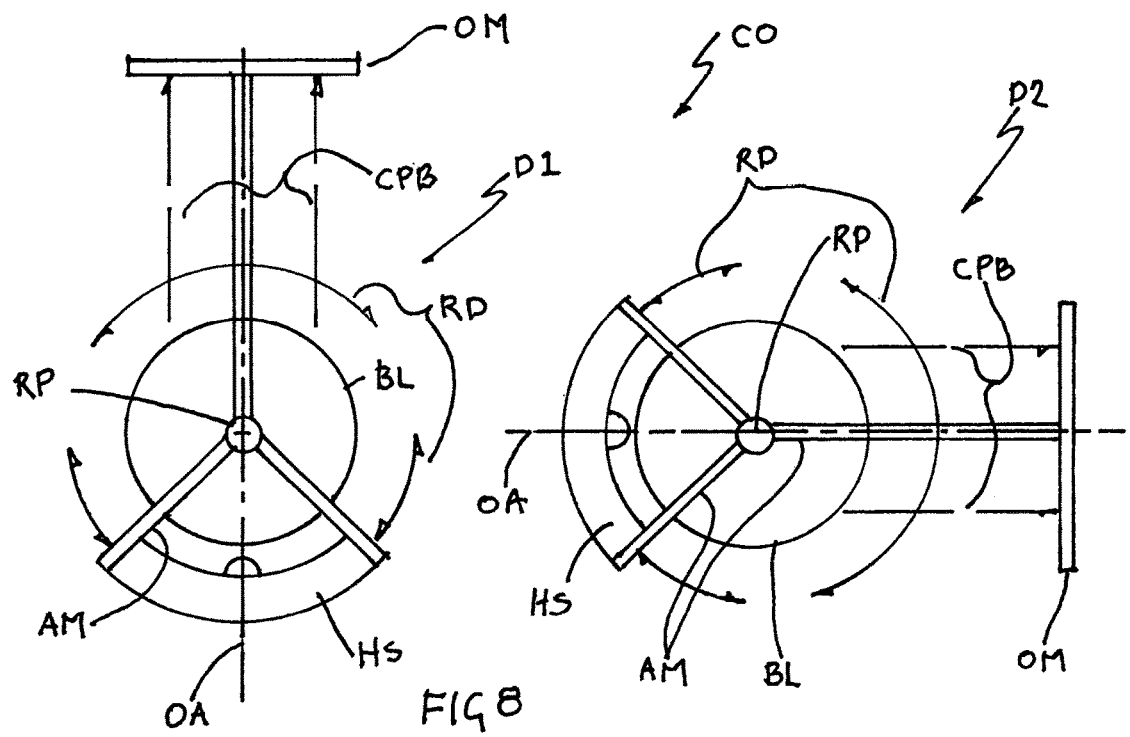
FIG. 8 is a two view diagram of an optical system similar to that of FIG. 7 differing in that the mechanical device provides for a degree(s) of freedom for the entire optical chain to rotate.

FIG. 8 is a two part diagram D1 and D2 of an optical system CO similar to that of FIG. 7, illustrating two positions within the rotation of the optical axis OA and its associated optical chain of optical components around ball lens center point RP. The LED(s) is mounted to heat sink HS which in this embodiment forms a physical link between the LED and the mechanical assembly AM. Mechanical assembly AM physically supports and maintains a constant distance between the optical components LED, ball lens BL and optical modifier OM.

Figure 9:
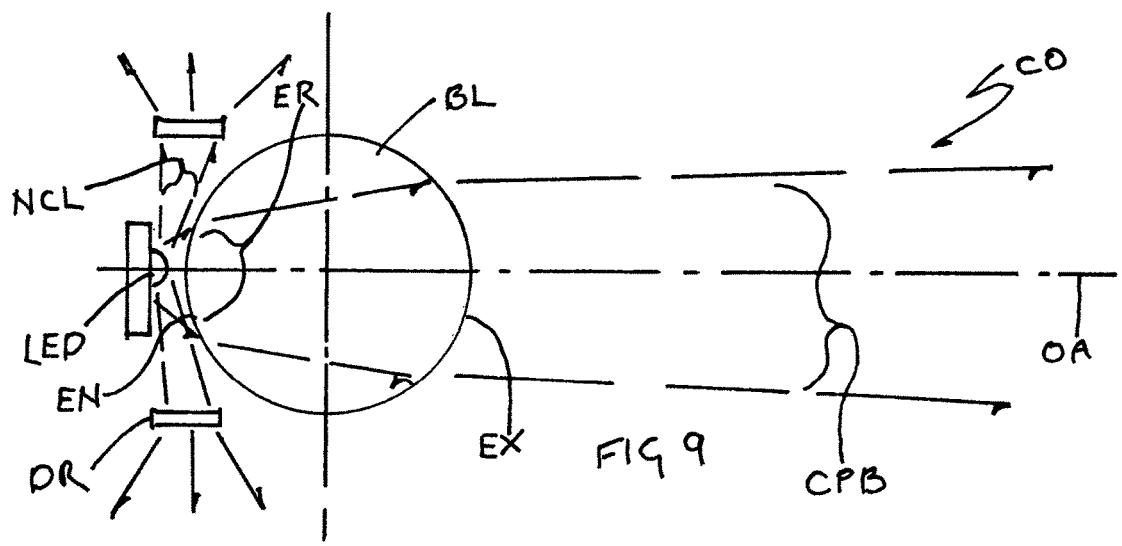
FIG. 9 is a diagram of an optical system an optical system containing three optical components, a first component being a light emanating LED, a second component being ball lens capturing a portion of the light emanating from the LEI), and a third component capturing a portion of the light not captured by the ball lens, being a refractive element.

FIG. 9 is a diagram of an optical system containing an optical chain CO containing a minimum of three optical components aligned along an optical axis OA. The first of the three optical components being a quasi-point light source such as an LED, the second component being a ball lens which collects and concentrates a portion of the light ER emanating from LED, and projects the light as a concentrated beam CPB away from the ball lens BL, and the third component being a refracting ring RF at least partially surrounds the LED, being so disposed as to intercept and refract at least a portion of the light NCL emanating from the LED that is not intercepted and collected by the ball lens BL. Refracting ring RF can comprise a prismatic surface(s) that widens the spread of light NCl, or in another embodiment refracting RF could be fabricated to have a convex cross section to concentrate and project light NCL as a sectionally focused radial beam outward and away from the optical axis.

Figure 10:
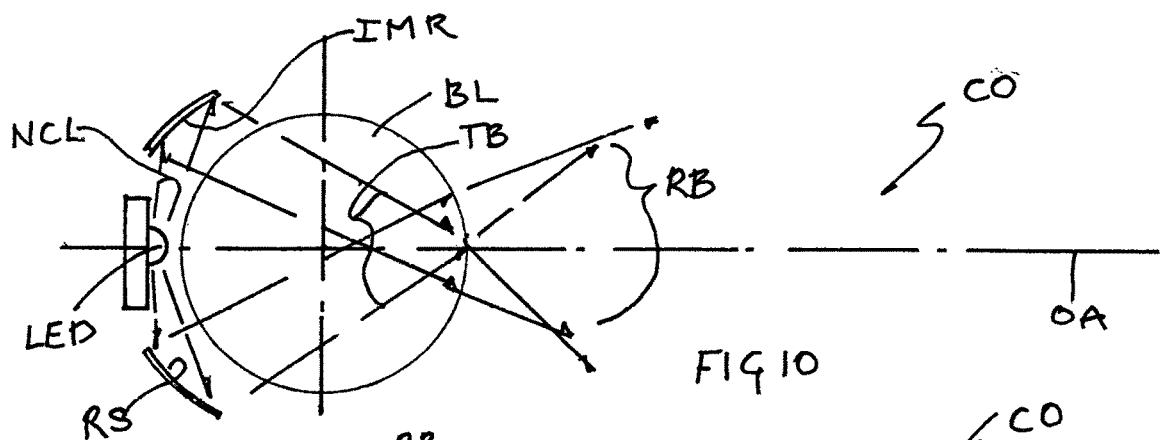
FIG. 10 is a diagram of an optical system similar to that of FIG. 9, the third component being a reflective element.

FIG. 10 is a diagram of an optical system similar to the optical system described in FIG. 9 differing in that the third component has reflective surface RS, that reflects at least a portion of the Light NCL a converging area TB into through ball lens BL, and exiting a diverging beam RB.

Figure 11:
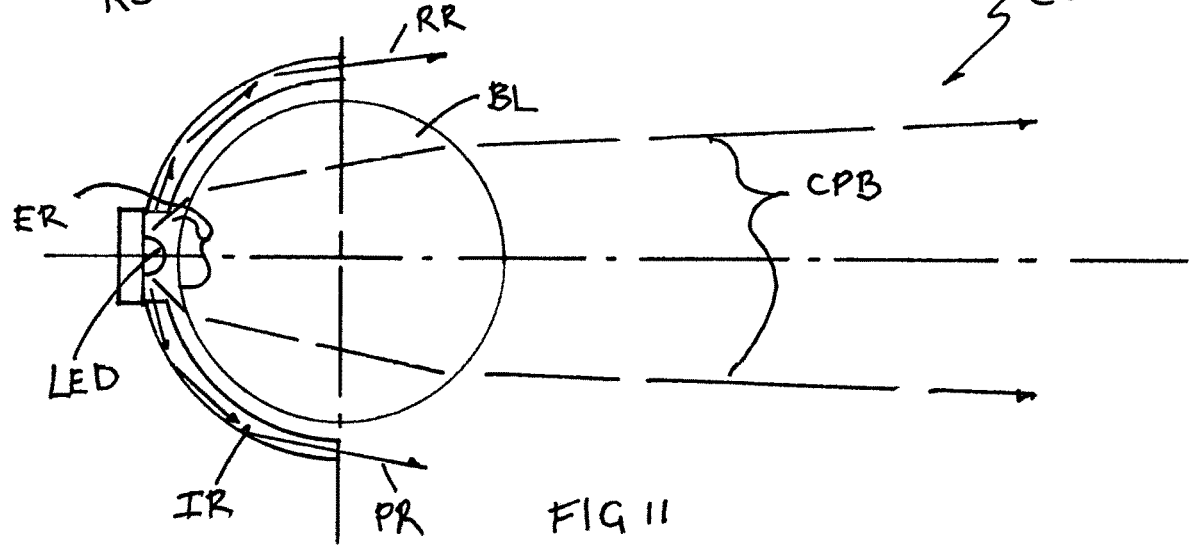
FIG. 11 is a diagram of an optical system similar that of FIG. 9, the third component being a light guide.

FIG. 11 is a diagram of an optical system similar to the optical system described in FIG. 9, differing in that the third component is a light guide LG. Light guide LG is so disposed as to collect, internally reflect and guide light to exit outward through the guide.

FIG. 12 is a diagram of an optical system CO similar to the optical system described in FIG. 4, with the addition of adding the capability of projecting multiple illuminated images IB1, IB2 and IB3. This is achieved by placing imaging plates IMG1, IMG2 and IMG3 respectively between the LEDs, LED, LED2 and LED3 and the common ball lens BL. An objective lens CL can be employed to change the size of at least one of the projected images. In order to provide a focused projected image, a mechanical system could be employed to change the distances (represented by arrow AD) between the LEDs and the image plates, and the distance between the image plates and the common ball lens BL. Imaging plates can be fabricated from such materials as plastic films, glass, metal or plastic stencils, and contain such imagery as graphic and photographic. Also LCD screens could be used as an alternative to image plate to create animated projected images. A display screen OMS to can also be employed to receive and display the projected image. This embodiment does not imply a limitation of three optical chains or three projected images. At least some or all of the optical components described above, namely the LEDs, Image plates, LCD screens, ball lens, image screens and objective lenses can incorporated into a single lighting product such as a light bulb, or luminaire etc.

The present invention is illustratively described above in reference to the disclosed embodiments. Various modifications and changes may be made to the disclosed embodiments by persons skilled in the art without departing from the scope of the present invention as defined in the appended claims.

What is claimed is:

1. An optical system for use in various lighting products and applications, comprising:
    a chain of optical components, each component substantially aligned along a common optical axis, the chain including:
    a first component being an LED;
    a second component being a first optic being a substantially spherical ball lens that collects and projects light emanating from the LED as a concentrated beam;
    a third component being a second optic being a reflector, so disposed along the common optical axis to intercept and reflect the beam projected from the ball lens and oriented and positioned relative to the ball lens so as to reflect substantially all light from the concentrated beam away from the ball lens,
    wherein the reflector is mounted on a mechanical device capable of repositioning the reflector to redirect the concentrated beam projected from the ball lens optic.

2. An optical system for use in various lighting products and applications, comprising:
    a chain of optical components, each component substantially aligned along a common optical axis, the chain including:
    a first component being an LED;
    a second component being a first optic being a substantially spherical ball lens that collects and projects light emanating from the LED as a concentrated beam;
    a third component being a second optic being a reflector, so disposed along the common optical axis to intercept and reflect the beam projected from the ball lens and oriented and positioned relative to the ball lens so as to reflect substantially all light from the concentrated beam away from the ball lens; and
    another LED positioned to emit and direct light through the ball lens for projection from the ball lens as a concentrated beam along a separate optical axis.

* * * * *